No. 734,889. Patented July 28, 1903.

UNITED STATES PATENT OFFICE.

GEORG KLENK, OF HAMBURG, GERMANY.

TANNIN EXTRACT AND PROCESS OF MAKING SAME.

SPECIFICATION forming part of Letters Patent No. 734,889, dated July 28, 1903.

Application filed May 20, 1903. Serial No. 157,947. (No specimens.)

*To all whom it may concern:*

Be it known that I, GEORG KLENK, doctor of philosophy, a citizen of the German Empire, residing at 20 Billhornerkanalstrasse, Hamburg, Germany, have invented certain Improvements in Tanning Extracts and Processes of Making the Same, of which the following is a specification.

According to the United States Patent No. 720,157 granted to me liquid tannin extracts, which being sufficiently decolorized are soluble in cold water, are obtained by treating the crude tannin solution first with alumina sulfate and subsequently with sodium bisulfite. As pointed out in my application for Letters Patent filed April 3, 1903, Serial No. 150,989, the same liquid extracts may be obtained by heating the thus-treated tannin solutions in a closed receptacle to a temperature between 120° to 130° Celsius. Now I have found that by concentrating in a vacuum the liquid tannin extracts, which are prepared as hereinbefore stated, a product is obtained which remaining still ropy in the vacuum at a temperature of about 60° to 65° Celsius solidifies when cooling in such a manner that it may be beaten to pieces with a hammer. The thus-obtained solid tannin extract has a bright dark-colored fracture surface and contains about twenty-two per cent. of water, from sixty-eight to seventy per cent. of tannin, and from five to six per cent. of ashes. The ashes consist for a large portion of a mixture of sodium sulfate, sodium sulfite, small amounts of calcic sulfate, and considerable traces of alumina. The said solid tannin extract dissolves slowly already in cold water, but more readily in hot water, and the solutions of 6° to 8° Baumé will not give any precipitate when cooling. Thereby the said solid extracts essentially differ from the hitherto known solid tannin extracts which are not soluble in cold water.

The solutions of the tannin extracts prepared as hereinbefore described are pretty dark colored, and yet impart to the leather a color differing but slightly from that which is produced by oak tanning. Further, the said solutions have an acid reaction and the addition of organic acids will not produce any precipitate.

Having now described my invention, I claim—

1. The herein-described process for manufacturing solid tannin extracts soluble in cold water, which process consists in treating the crude tannin solution first with alumina sulfate and subsequently with sodium bisulfite, then heating the mixture in a closed receptacle to a temperature between 120° and 130° Celsius and finally concentrating the obtained liquor in a vacuum and cooling the resulting product, substantially as described.

2. As a new article of manufacture, a solid tannin extract soluble in cold water, which extract contains about sixty-eight to seventy per cent. of tannin, small amounts of sodium sulfate, sodium sulfite and calcic sulfate and about twenty-two per cent. of water and which extract being dark colored and having a bright fracture surface when dissolved in water has an acid reaction and with addition of organic acid and at a strength of 6° to 8° Baumé produces no precipitate, substantially as set forth.

In testimony that I claim the foregoing as my invention I have signed my name in presence of two subscribing witnesses.

GEORG KLENK.

Witnesses:
JOHANNES GROSS,
CLAUS RANYUNSUN.